(12) United States Patent
Bouton

(10) Patent No.: US 11,344,018 B1
(45) Date of Patent: May 31, 2022

(54) FISH RETRIEVAL SYSTEM

(71) Applicant: Billy A. Bouton, New Iberia, LA (US)

(72) Inventor: Billy A. Bouton, New Iberia, LA (US)

( * ) Notice: Subject to any disclaimer, the term of this patent is extended or adjusted under 35 U.S.C. 154(b) by 422 days.

(21) Appl. No.: 16/392,499

(22) Filed: Apr. 23, 2019

Related U.S. Application Data

(60) Provisional application No. 62/661,693, filed on Apr. 24, 2018.

(51) Int. Cl.
*A01K 97/14* (2006.01)
*A01K 83/04* (2006.01)

(52) U.S. Cl.
CPC .............. *A01K 97/14* (2013.01); *A01K 83/04* (2013.01)

(58) Field of Classification Search
CPC ................. A01K 97/14; A01K 97/24
USPC ......... 43/5, 17.2; 294/17.2, 19.3, 66.1, 82.1, 294/86.1, 86.4, 87.1, 99.1, 106
See application file for complete search history.

(56) References Cited

U.S. PATENT DOCUMENTS

| | | | |
|---|---|---|---|
| 1,031,903 A * | 7/1912 | Anderson | B63C 11/50 294/66.1 |
| 1,044,792 A | 11/1912 | Levy | |
| 1,555,748 A * | 9/1925 | Lutz | A01K 97/14 294/66.2 |
| 1,721,205 A * | 7/1929 | Clanton | A01K 97/14 43/34 |
| 1,982,132 A * | 11/1934 | Boles | A01K 97/14 43/5 |
| 1,988,160 A | 1/1935 | Butte | |
| 2,074,057 A | 3/1937 | Kempe | |
| 2,175,135 A | 10/1939 | Sorenson et al. | |
| 2,210,271 A * | 8/1940 | Thwaits | A01K 97/14 43/5 |
| 2,233,670 A * | 3/1941 | Lee | A01K 97/14 43/5 |
| 2,235,371 A * | 3/1941 | Jyrkas | A01K 97/14 43/5 |
| 2,236,371 A | 3/1941 | Jyrkas | |
| 2,443,061 A | 6/1948 | Waltamath | |
| 2,453,245 A | 11/1948 | McDonald, Jr. | |
| 2,479,448 A | 8/1949 | Woock | |
| 2,481,975 A | 9/1949 | Brooks | |
| 2,482,037 A * | 9/1949 | Swaim | A01K 97/24 43/17.2 |
| 2,488,996 A | 11/1949 | Thompson | |
| 2,493,100 A | 1/1950 | Adams, Jr. | |
| 2,507,495 A | 5/1950 | Barthel | |
| 2,534,790 A | 12/1950 | Moore | |
| 2,553,173 A | 5/1951 | Consolo et al. | |
| 2,562,413 A | 7/1951 | Carr | |
| 2,586,073 A | 2/1952 | McKee | |
| 2,597,229 A | 5/1952 | Cox | |
| 2,608,785 A | 9/1952 | Hall | |
| 2,609,632 A * | 9/1952 | Davis | A01K 97/24 43/17.2 |

(Continued)

FOREIGN PATENT DOCUMENTS

| | | | | |
|---|---|---|---|---|
| FR | 779271 A * | 4/1935 | ............. | A01K 97/14 |
| FR | 782511 A * | 6/1935 | ............. | A01K 97/14 |

(Continued)

*Primary Examiner* — Darren W Ark
(74) *Attorney, Agent, or Firm* — Greg Mier

(57) ABSTRACT

A device that can be used by an angler when fishing to lift a heavy fish out of the water without breaking the angler's fishing line or rod.

6 Claims, 3 Drawing Sheets

(56) References Cited

U.S. PATENT DOCUMENTS

| | | | |
|---|---|---|---|
| 2,627,691 A | 2/1953 | Bress | |
| 2,641,078 A * | 6/1953 | Gearien | A01K 97/14 43/5 |
| 2,683,322 A | 7/1954 | Clark | |
| 2,712,706 A | 7/1955 | Gendron | |
| 2,714,777 A | 8/1955 | Peak | |
| 2,722,077 A | 11/1955 | Newman | |
| 2,760,810 A | 8/1956 | Smith | |
| 2,761,235 A | 9/1956 | Payne | |
| 2,764,833 A * | 10/1956 | Clark | A01K 97/24 43/17.2 |
| 27,770,062 | 11/1956 | Russell | |
| 2,779,120 A | 1/1957 | Moore | |
| 2,807,905 A | 10/1957 | Ford | |
| 2,807,906 A * | 10/1957 | Mun | A01K 97/24 43/17.2 |
| 2,809,460 A | 10/1957 | Taylor | |
| 2,826,849 A | 3/1958 | Frederick | |
| 2,827,730 A | 3/1958 | Hunt | |
| 2,828,570 A | 4/1958 | Bradbury | |
| 2,866,290 A | 12/1958 | Karry | |
| 2,906,050 A | 9/1959 | Foster et al. | |
| 2,909,861 A | 10/1959 | Leming | |
| 2,915,845 A | 12/1959 | Hughes | |
| 2,926,449 A | 3/1960 | Rupert | |
| 2,948,077 A | 8/1960 | Karpes | |
| 2,950,558 A | 8/1960 | Karpes | |
| 3,010,241 A | 11/1961 | Terry | |
| 3,012,355 A | 12/1961 | Cottrell | |
| 3,039,223 A | 6/1962 | Pavek | |
| 3,092,925 A * | 6/1963 | Ho | A01K 97/14 43/5 |
| 3,095,662 A * | 7/1963 | Puckett | A01K 97/14 43/5 |
| 3,144,728 A | 8/1964 | Stevens | |
| 3,156,064 A | 11/1964 | Czirr | |
| 3,163,955 A | 1/1965 | Lockwood | |
| 3,176,425 A | 4/1965 | Mudd | |
| 3,178,846 A | 4/1965 | Hansen | |
| 3,186,121 A | 6/1965 | Jones | |
| 3,191,335 A * | 6/1965 | Sobetzer | A01K 97/24 43/17.2 |
| 3,216,143 A | 11/1965 | Seldon | |
| 3,224,132 A | 12/1965 | Frantz | |
| 3,243,911 A | 4/1966 | Splawinski | |
| 3,246,415 A | 4/1966 | Forbes | |
| 3,336,067 A * | 8/1967 | Cloyd | A01K 97/24 294/66.1 |
| 3,352,049 A | 11/1967 | Agostini | |
| 3,360,292 A | 12/1967 | Trammell | |
| 3,364,611 A | 1/1968 | Downing | |
| 3,375,602 A | 4/1968 | Clark et al. | |
| 3,404,482 A | 10/1968 | Maske | |
| 3,512,292 A | 5/1970 | Splawinski | |
| 3,531,887 A | 10/1970 | Bortle | |
| 3,550,303 A * | 12/1970 | Western | A01K 97/24 43/17.2 |
| 3,568,353 A * | 3/1971 | Kilgore | A01K 97/24 43/17.2 |
| 3,628,279 A | 12/1971 | Halone | |
| 3,643,366 A * | 2/1972 | Gates | A01K 97/24 43/17.2 |
| 3,688,429 A | 9/1972 | Mauck | |
| 3,694,952 A * | 10/1972 | Matthews | A01K 97/14 43/5 |
| 3,729,854 A * | 5/1973 | Satama | A01K 97/24 43/17.2 |
| 3,772,815 A * | 11/1973 | Burgess | A01K 97/24 43/17.2 |
| 3,792,545 A | 2/1974 | Hendrickson | |
| 3,803,749 A | 4/1974 | Boyum | |
| 3,805,435 A | 4/1974 | Serrill | |
| 3,861,071 A | 1/1975 | Nordhagen | |
| 3,987,573 A * | 10/1976 | Clayton | A01K 97/24 43/17.2 |
| 4,043,072 A | 8/1977 | Condurso | |
| 4,057,925 A | 11/1977 | Wong | |
| 4,085,537 A * | 4/1978 | Todd | A01K 97/24 43/17.2 |
| 4,145,832 A | 3/1979 | Knight, Jr. | |
| 4,152,859 A | 5/1979 | Hansen | |
| 4,155,190 A | 5/1979 | McInturff et al. | |
| 4,182,066 A | 1/1980 | Harmon | |
| 4,223,465 A * | 9/1980 | Nichols | A01K 97/24 294/66.1 |
| 4,286,402 A | 9/1981 | Kuhn et al. | |
| 4,408,411 A | 10/1983 | Skarnells | |
| 4,433,501 A | 2/1984 | Maxwell | |
| 4,467,547 A | 8/1984 | Chabot | |
| 4,536,984 A | 8/1985 | Kowal | |
| 4,598,493 A | 7/1986 | O'Brien et al. | |
| 4,712,324 A | 12/1987 | Padgett | |
| 4,756,112 A | 7/1988 | Sprague | |
| 4,766,689 A | 8/1988 | Stinar, Sr. et al. | |
| 4,885,863 A | 12/1989 | Sprague | |
| 4,930,244 A | 6/1990 | Enwiller | |
| 4,986,022 A | 1/1991 | Wilkinson | |
| 5,076,002 A | 12/1991 | Kelly | |
| 5,081,784 A | 1/1992 | Santucci et al. | |
| 5,157,856 A | 10/1992 | Packer | |
| 5,209,006 A | 5/1993 | Wilhelmer | |
| 5,452,537 A | 9/1995 | Ellison | |
| 5,615,511 A | 4/1997 | Crane et al. | |
| 5,704,156 A * | 1/1998 | DiLello | A01K 97/14 294/19.3 |
| 5,724,762 A | 3/1998 | Thompson | |
| 5,864,979 A | 2/1999 | Iannuccilli et al. | |
| 6,038,807 A | 3/2000 | Taylor | |
| 6,079,143 A | 6/2000 | Cheatham, Sr. | |
| 6,442,886 B1 | 9/2002 | McAfee et al. | |
| 6,463,692 B1 | 10/2002 | Johnsen | |
| 6,694,664 B1 | 2/2004 | Knight | |
| 6,705,040 B1 | 3/2004 | New | |
| 6,931,780 B2 | 8/2005 | Cote | |
| 7,451,567 B2 | 11/2008 | Irvine | |
| 8,302,344 B2 | 11/2012 | Pickens | |
| 8,539,711 B2 | 9/2013 | Leuckel | |
| 9,027,275 B2 * | 5/2015 | Eberhart | A01K 97/14 43/5 |

FOREIGN PATENT DOCUMENTS

| | | | | |
|---|---|---|---|---|
| FR | 899445 A | * | 5/1945 | A01K 97/14 |
| FR | 1511261 A | * | 1/1968 | A01K 97/14 |
| GB | 1102669 A | * | 2/1968 | A01K 77/00 |
| GB | 2219477 B | * | 3/1992 | A01K 97/24 |
| JP | 01199532 A | * | 8/1989 | |
| JP | 07059489 A | * | 3/1995 | |
| JP | 2001017052 A | * | 1/2001 | |
| JP | 2003111549 A | * | 4/2003 | |
| JP | 3148620 U | * | 2/2009 | |

* cited by examiner

FISH RETRIEVAL SYSTEM

FIELD OF THE INVENTION

The subject invention relates to devices for retrieving fish from the end of a fishing line.

BACKGROUND

Fishing is the activity of trying to catch fish. There are many fishing techniques and tactics for catching fish, including hand gathering, spearfishing, netting, angling, and trapping. Recreational, commercial, and artisanal fishers use different techniques and sometimes use the same techniques. Recreational fishers typically use angling methods, commercial fishers typically use netting methods, and artisanal fishers typically use traditional, low-tech methods for survival in third-world countries.

Focusing on recreational fishers, the most common form of recreational fishing is done with a rod, reel, line, hooks, and any one of a wide range of baits or lures. The practice of catching or attempting to catch fish with a rod, reel, line, hooks, and any one of a wide range of baits or lures is generally known as angling. An angler sometimes catches a fish that is too heavy to lift out of the water without the risk of breaking the fishing line or the rod. The present invention is a device that can be used to lift a heavy fish out of the water without breaking the fishing line or the rod.

BRIEF DESCRIPTION OF THE DRAWINGS

The accompanying drawings are provided for the purpose of illustration only and are not intended as a definition of the limits of the present invention.

The drawings illustrate two embodiments of the present invention, wherein.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

Figure 1:
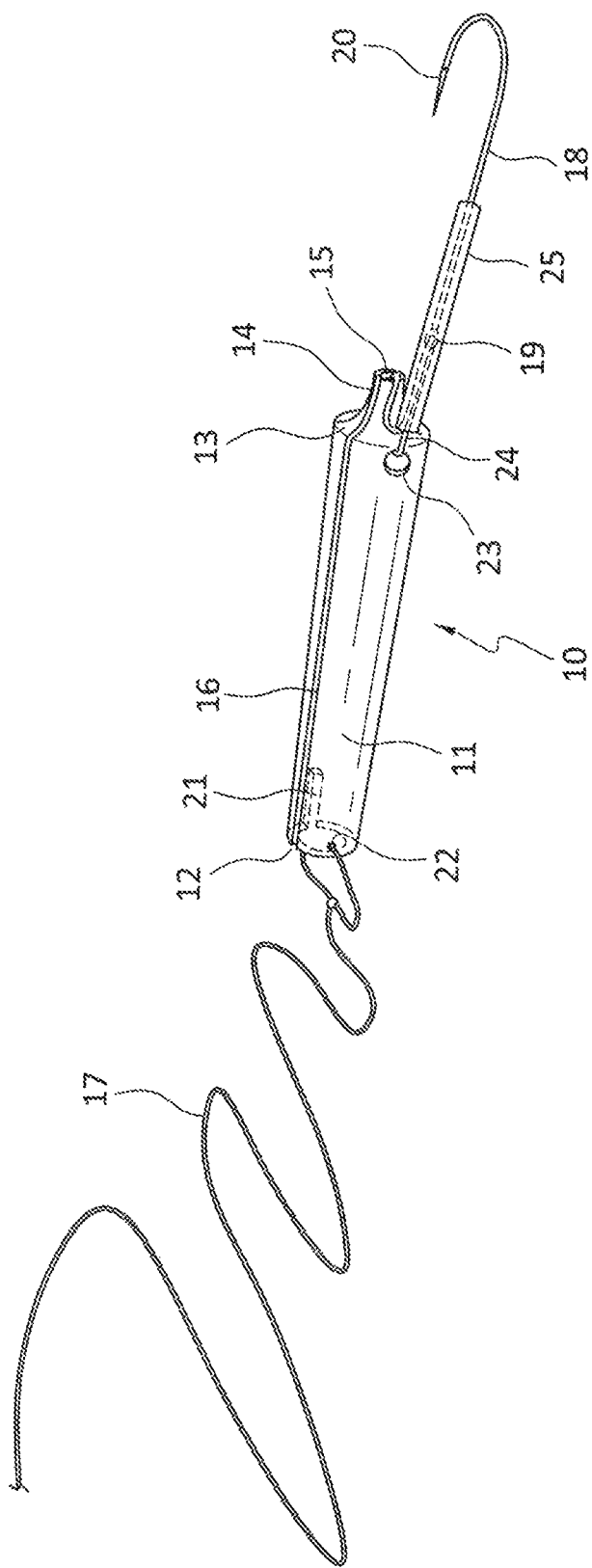
FIG. 1 is an isometric view of the preferred embodiment of the present invention.
Figure 2:
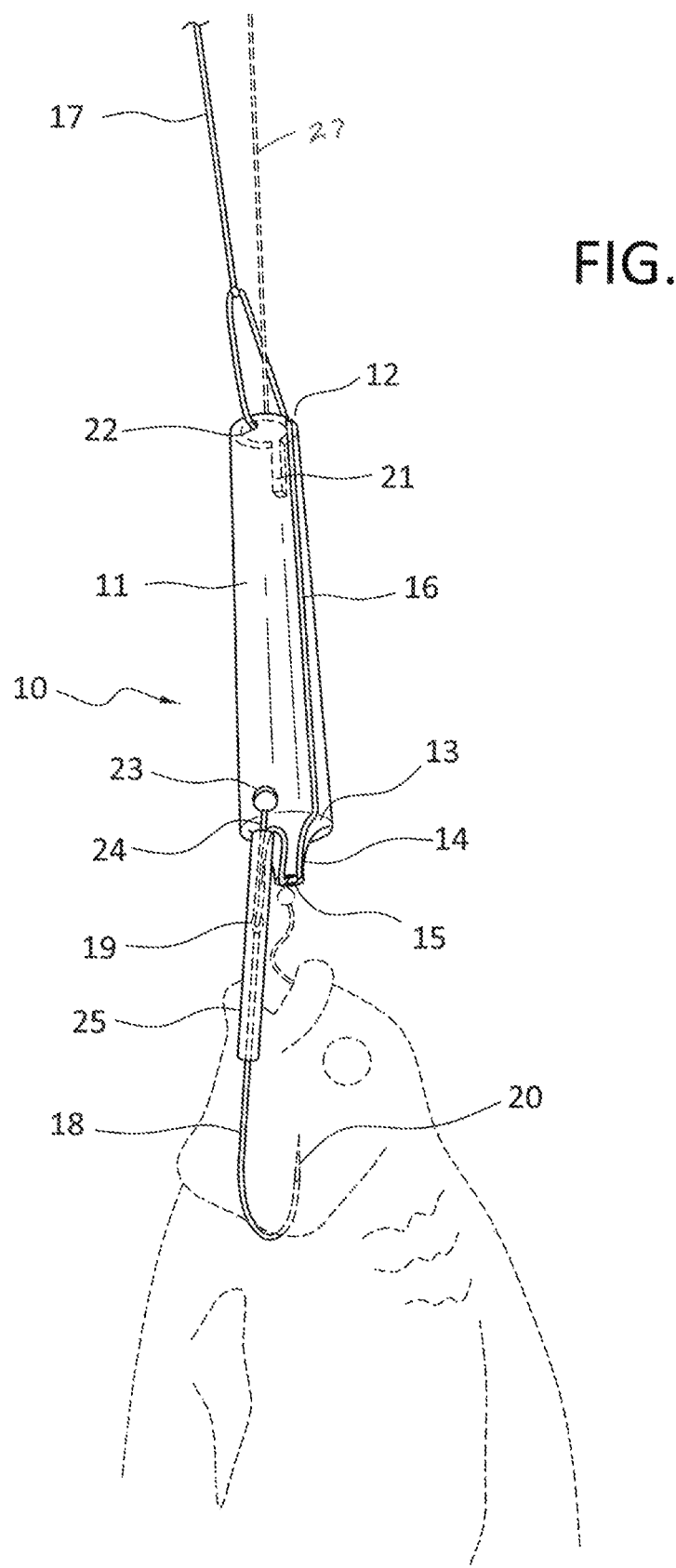
FIG. 2 is another isometric view of the preferred embodiment of the present invention.
Figure 3:
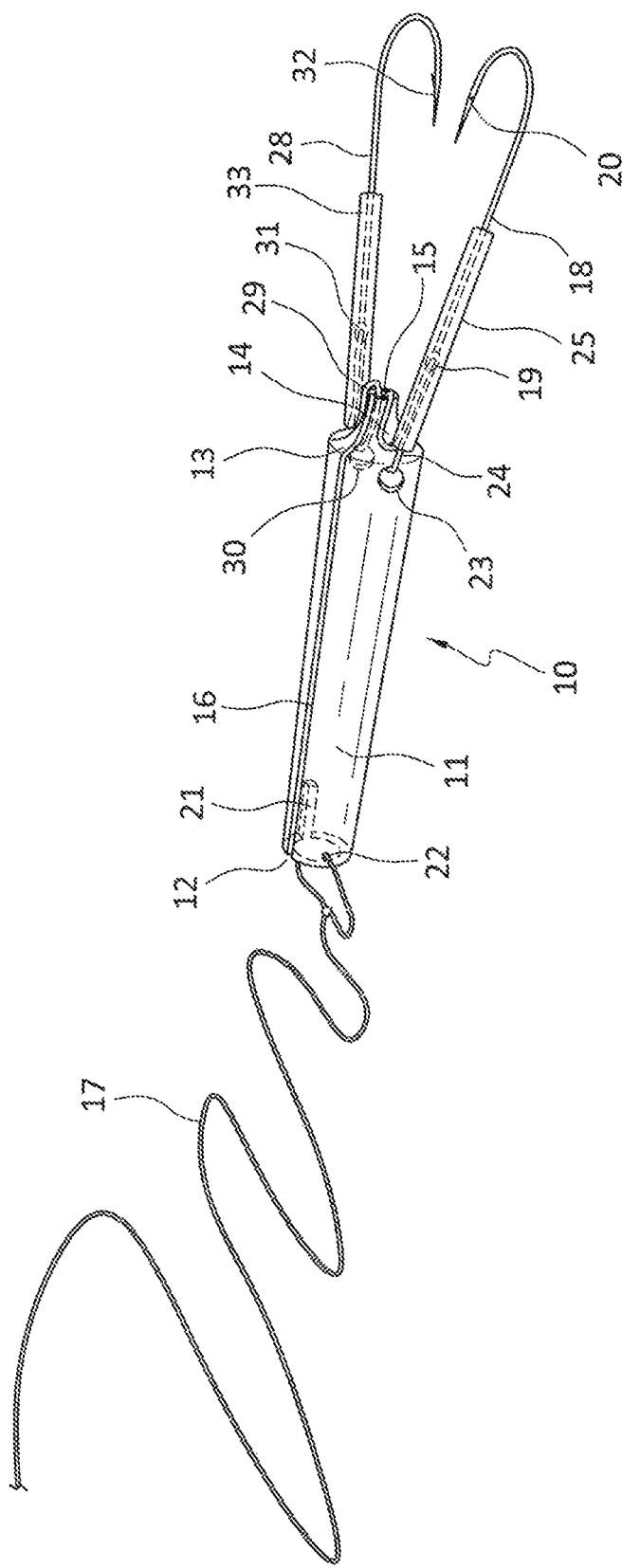
FIG. 3 is an isometric view of a second embodiment of the present invention.

As shown in FIGS. 1 through 3, the preferred embodiment of the fish retriever 10 preferably includes a generally cylindrical, hollow tube 11. Tube 11 is preferably manufactured using the process of injection molding. The preferred material of construction is high-density polyethylene ("HDPE") but can also include other thermoplastic and thermosetting polymers.

As shown in FIGS. 1 through 3, the first end 12 of tube 11 is preferably open and the second end 13 of tube 11 has a bottle neck 14 with an opening 15 at the narrow end of bottle neck 14. Tube 11 preferably has a longitudinal slit 16 extending from first end 12 to opening 15 at the narrow end of bottle neck 14. The width of slit 16 is preferably wide enough to enable the user of fish retriever 10 to place fishing line inside hollow tube 11 by passing the fishing line through slit 16. The diameter of fishing line is approximately 0.005 for 4-pound test line and approximately 0.05 inches for 125-pound test line, so a width of slit 16 in the range of 0.02 inches and 0.06 inches should accommodate most fishing lines.

As shown in FIGS. 1 through 3, tube 11 is preferably equipped with two small holes 22 (one hole not shown) near first end 12 of tube 11 for attaching line 17 to tube 11. Line 17 is passed through holes 22 near first end 12 of tube 11 and secured in such a way that tube 11 does not unintentionally separate from line 17 while fish retriever 10 is in use. Line 17 can be secured to fish retriever 10 by tying a knot in line 17 or by placing a crimp on line 17 or by any other means known to those skilled in the art. Line 17 can be as long as necessary to reach the fishing depths where heavy fish may be caught. Line 17 preferably has a heavier test weight than normal fishing line and is used to lift a heavy fish out of the water without breaking the angler's fishing line or rod.

As shown in FIGS. 1 and 2, tube 11 is preferably equipped with at least one hole 23 near second end 13 of tube 11 for attaching leader 24 to tube 11. Leader 24, which is attached to hook 18, is preferably passed through hole 23 and hole 15 and then secured in such a way that tube 11 does not unintentionally separate from leader 24 while fish retriever 10 is in use. Hook 18 is preferably attached to leader 24 at the end 19 of hook 18 where the eye of hook 18 is typically located, with the barb 20 of hook 18 extending beyond second end 13 of fish retriever 10, as shown in FIGS. 1 through 3. The connection between leader 24 and hook 18 provides a flexible pivot for hook 18 so that barb 20 of hook 18 can more easily snag the heavy fish through the mouth, gills, or some other part of the heavy fish's anatomy. Any loose ends of leader 24 in the connection between leader 24 and hook 18 are preferably covered with wrap 25 to prevent the loose ends from snagging on anything while fish retriever 10 is in use.

As shown in FIGS. 1 through 3, tube 11 is preferably equipped with a longitudinal slot 21 at the first end 12 of tube 11. One purpose of slot 21 is to receive the cured end of hook 18 when fish retriever 10 is not in use so that the barbed end of hook 18 remains inside tube 11 when fish retriever 10 is not in use. Another purpose of slot 21 is to receive the far end of line 17 after line 17 has been wrapped around tube 11 when fish retriever 10 is taken out of use. Placing the far end of line 17 into slot 21 helps to prevent line 17 from unraveling around tube 11 when fish retriever 10 is not in use.

The combined density of the parts of fish retriever 10, including tube 11, hook 18, and leader 24, is preferably greater than the density of fresh water and/or salt water so that fish retriever 10 will slide down a fishing line through either fresh water or salt water to snag a heavy fish at the end of the fishing line.

To use fish retriever 10, the fishing line 27 (shown in FIG. 2) having a heavy fish attached to it is placed inside tube 11 by slipping fishing line 27 through slit 16 of tube 11, as shown in FIG. 2, with second end 13 of tube 11 closer to the heavy fish than first end 12 of tube 11. Fish retriever 10 is then allowed to slide down fishing line 27, while the angler lets out line 17 as much as necessary. When fish retriever 10 reaches the end of fishing line 27, line 17 is manipulated to activate the flexible pivot in the connection between leader 24 and hook 18 until barb 20 on hook 18 snags the heavy fish through the mouth, gills, or some other part of the heavy fish's anatomy. The angler then pulls in line 17 until the angler can handle the heavy fish without the risk of breaking the fishing line 27 or the fishing rod.

An alternative embodiment of fish retriever 10 is shown in FIG. 3. The alternative embodiment of fish retriever 10 is preferably equipped with a second hook 28 and accompanying leader 29 attached to fish retriever 10 near second end of tube 11, as shown in FIG. 3. Second leader 29, which is attached to second hook 28, is preferably passed through hole 30 and hole 15 and then secured in such a way that tube 11 does not unintentionally separate from second leader 29 while fish retriever 10 is in use. Second hook 28 is preferably attached to second leader 29 at the end 31 of second hook 28 where the eye of second hook 28 is typically located, with the barb 32 of second hook 28 extending beyond second end 13 of fish retriever 10, as shown in FIG. 3. The connection between second leader 29 and second hook 28 provides a flexible pivot for second hook 28 so that barb 32 of second hook 28 can more easily snag the heavy fish through the mouth, gills, or some other part of the heavy fish's anatomy. Any loose ends of second leader 29 in the connection between second leader 29 and second hook 28 are preferably covered with wrap 33 to prevent the loose ends from snagging on anything while fish retriever 10 is in use.

It is understood that several embodiments of the present invention have been disclosed by way of example and that other modifications and alterations may occur to those skilled in the art without departing from the scope and spirit of the present invention.

What is claimed is:

1. A fish retriever comprising:
   (a) a hollow tube, said hollow tube having a curved side, a first end, and a second end, said first end of said hollow tube having an opening, said second end of said hollow tube having a bottle neck with a narrow end, said narrow end of said bottle neck having an opening, said hollow tube having a slit extending through said curved side of said hollow tube from said opening at said first end of said hollow tube to said opening at said narrow end of said bottle neck at said second end of said hollow tube, said hollow tube having two holes extending through said curved side of said hollow tube near said first end of said hollow tube, said hollow tube having at least one hole extending through said curved side of said hollow tube near said second end of said hollow tube;
   (b) a line secured to said hollow tube, said line having a near end and a far end; said near end of said line extending through said two holes extending through said curved side of said hollow tube near said first end of said hollow tube, said line being secured to said fish retriever to prevent said line from unintentionally separating from said tube while said fish retriever is in use;
   (c) a leader secured to said hollow tube, said leader extending through said at least one hole extending through said curved side of said hollow tube near said second end of said hollow tube, said leader extending through said opening in said narrow end of said bottle neck at said second end of said hollow tube;
   (d) a hook connected to said leader, said hook having an eye at one end and a barb at another end, said hook being connected to said leader at said one end of said hook having said eye, thereby creating a flexible pivot between said leader and said hook; and
   (e) a wrap covering a portion of said leader near where said leader is connected to said hook, said wrap covering a portion of said hook near said one end of said hook having said eye.

2. The fish retriever of claim 1, further comprising a longitudinal slot for receiving said hook and said far end of said line, said longitudinal slot extending through said curved side of said hollow tube at said first end of said hollow tube.

3. The fish retriever of claim 2, where said slit extending through said curved side of said hollow tube from said opening at said first end of said hollow tube to said opening at said narrow end of said bottle neck at said second end of said hollow tube has a width in the range of 0.02 inches and 0.06 inches.

4. A fish retriever comprising:
   (a) a hollow tube, said hollow tube having a curved side, a first end, and a second end, said first end of said hollow tube having an opening, said second end of said hollow tube having a bottle neck with a narrow end, said narrow end of said bottle neck having an opening, said hollow tube having a slit extending through said curved side of said hollow tube from said opening at said first end of said hollow tube to said opening at said narrow end of said bottle neck at said second end of said hollow tube, said hollow tube having two holes extending through said curved side of said hollow tube near said first end of said hollow tube, said hollow tube having a first hole and a second hole extending through said curved side of said hollow tube near said second end of said hollow tube;
   (b) a line secured to said hollow tube, said line having a near end and a far end, said near end of said line extending through said two holes extending through said curved side of said hollow tube near said first end of said hollow tube, said line being secured to said fish retriever to prevent said line from unintentionally separating from said tube while said fish retriever is in use;
   (c) a first leader secured to said hollow tube, said first leader extending through said first hole extending through said curved side of said hollow tube near said second end of said hollow tube, said first leader extending through said opening in said narrow end of said bottle neck at said second end of said hollow tube;
   (d) a first hook connected to said first leader, said first hook having an eye at one end and a barb at another end, said first hook being connected to said first leader at said one end of said first hook having said eye, thereby creating a flexible pivot between said first leader and said first hook;
   (e) a first wrap covering a portion of said first leader near where said first leader is connected to said first hook, said first wrap covering a portion of said first hook near said one end of said first hook having said eye;
   (f) a second leader secured to said hollow tube, said second leader extending through said second hole extending through said curved side of said hollow tube near said second end of said hollow tube, said second leader extending through said opening in said narrow end of said bottle neck at said second end of said hollow tube;
   (g) a second hook connected to said second leader, said second hook having an eye at one end and a barb at another end, said second hook being connected to said second leader at said one end of said second hook having said eye, thereby creating a flexible pivot between said second leader and said second hook; and (h) a second wrap covering a portion of said second leader near where said second leader is connected to said second hook, said second wrap covering a portion of said second hook near said one end of said second hook having said eye.

5. The fish retriever of claim 4, further comprising a longitudinal slot for receiving said first hook, said second hook, and said far end of said line, said longitudinal slot extending through said curved side of said hollow tube at said first end of said hollow tube.

6. The fish retriever of claim 5, where said slit extending through said curved side of said hollow tube from said opening at said first end of said hollow tube to said opening at said narrow end of said bottle neck at said second end of said hollow tube has a width in the range of 0.02 inches and 0.06 inches.

\* \* \* \* \*